Patented Mar. 17, 1953

2,631,353

UNITED STATES PATENT OFFICE 2,631,353

STABILIZED ALUMINA PEBBLES

Sam P. Robinson, Bartlesville, Okla., assignor to Phillips Petroleum Company, a corporation of Delaware No Drawing. Application June 13, 1949, Serial No. 98,879

15 Claims. (Cl. 25—157)

The invention relates to the manufacture of stabilized alumina pebbles for pebble heat-exchange processes and to the use of such pebbles in such processes.

Pebble heater techniques being developed and applied to various gas heating, treating, and reaction processes at the present time make use of a compact stream of small refractory pebbles as a moving heat-exchange medium. These pebbles which are usually ceramic materials, although they may be metallic for some applications, are spheres ranging in size from about ⅛" to 1" in diameter. They may be either catalytic or non-catalytic in a given application. In typical pebble heater operation, a continuous compact mass of pebbles descends by gravity through a series of treating zones and upon emerging from the lowermost zone, they are elevated by a suitable elevator, usually of the bucket type, to a point above the uppermost zone for again gravitating through the system. The uppermost zone is usually a pebble heating zone where the pebbles are contacted in countercurrent flow with a stream of hot combustion gas so as to raise their temperature to a desired degree as they descend through the heating zone. The heated pebbles then pass into a reaction or gas heating zone where they impart heat to the gas being treated and in turn are cooled and require reheating. In some installations, a feed gas preheating zone is positioned just below the reaction or gas treating zone so as to further cool the pebbles before elevation and to preheat the feed gas to the reaction zone. Other installations utilize a pebble preheating zone positioned directly above the pebble heating zone proper where the pebbles are contacted with the effluent from the reaction zone so as to recover a substantial portion of the sensible heat thereof and simultaneously quench the reaction product.

In another type of pebble heat-exchange process, a gravitating mass of pebbles is utilized to maintain a cold zone or to cool a gas. The pebbles are cooled by contact with a cold gas in one chamber and the cold pebbles are then gravitated thru a second chamber in contact with the gas to be cooled. In such processes the pebbles undergo great differences in temperature with the usual mechanical shock and attrition forces involved in gravitating masses of pebbles.

The pebbles of the invention are utilized to advantage in such processes as those disclosed in my copending applications Serial No. 651,293, filed March 1, 1946, involving the production of $CS_2$, and Serial No. 662,149, filed April 15, 1946, relating to the cracking of hydrocarbons to hydrogen and coke, as well as in the process of the copending application of M. O. Kilpatrick, Serial No. 761,696, filed July 17, 1947, relating to the thermal conversion of hydrocarbons to more desirable hydrocarbons. These processes involve temperature changes of the order of 1000° to 2000° F. per minute, with severe mechanical shock and abrasive forces present.

The pebble heater finds its greatest utility in operations which require extremely fast heating rates and therefore extremely fast pebble cooling rates with concomitant thermal shock to the pebbles. In pebble heater processes involving more severe heating and cooling requirements, the pebbles are subjected to heating rates greater than 1000° F. per minute and cooling rates of more than 2000° F. per minute at maximum temperatures in the neighborhood of 3000° F. In addition to the severe thermal shock resulting from such rapid temperature changes, the pebbles are subjected to considerable mechanical shock in passing through the apparatus, especially in the elevator equipment and in dropping from the top of the elevator into the top of the pebble heating zone. It is found that considerable breakage and loss of pebbles occurs when using conventional commercial pebbles under such severe conditions of operation.

Pebbles which have been made from powdered alumina, mullite, and similar materials, by wetting the powder and rolling the material in conventional balling equipment until balls of the proper size have been formed, are found to exhibit laminar structure and suffer breakage under the strain of pebble heater operating conditions. Pebbles which are made by slugging and compacting the slugs into spheres do not exhibit this laminar structure and are much more resistant to breakage under pebble heater operating conditions. However, it has been found that even when pebbles have been made by slugging and compacting the slugs into balls, they must be fired at a temperature within a critical range in order to properly bond the pebble crystals and produce a pebble which is rugged under severe conditions of service. Critical ranges for firing alumina pebbles containing various additives are disclosed in my copending applications Serial No. 23,245, filed April 26, 1948; Serial No. 53,589, filed October 8, 1948; Serial No. 53,991, filed October 11, 1948; and Serial No. 52,774, filed October 4, 1948.

It has been found that commercially available high purity alumina pebbles while having some very desirable characteristics have not been very satisfactory in commercial operation. Exposed to fast cooling shock at high temperatures, alpha corundum crystals tend to grow. Repeated firing to high temperature levels accelerates this growth which takes place at the expense of smaller alumina crystals in the sintered bond by cannibalization. After a certain time the pebbles begin to have a granular structure replete with large cracks throughout the body. Mechanical shock such as dropping into elevating or conveying equipment soon fractures a large quantity of such pebbles because of gradual disappearance of the strong but small bonding crystals.

In addition because of the purity of the pebbles and their consequent high melting point, it is necessary to sinter new pebbles in their manufacture at very high temperatures in order to develop good bond strength. With pure pebbles such as 99% $Al_2O_3$ commercial grades, one obtains large surface crystals if firing temperatures are maintained high enough to develop good bond strength. Because of the high purity, the surface crystal edges are quite sharp and well defined. Such crystals cause very high attrition losses in service which helps to make such types of pebbles very unsuited economically for pebble heater use because of high breakage and attrition losses and the consequent need for high make-up purchases.

In a pebble heater process requiring the circulation of between 25,000 and 35,000 pounds of pebbles per hour with a temperature shock of approximately 1000° F. per minute the attrition and breakage loss on the best available commercially produced alumina pebble amounts to at least 200 pounds per day and runs as high as 700 pounds per day. This represents a loss of between 0.8 and 2% per day. The alumina pebbles were selected as the best available commercial pebbles. This substantial loss of pebbles due to attrition and breakage merely emphasizes the need for a rugged, attrition, and shock resistant pebble. It is with the improvement of high purity alumina pebble characteristics that this invention is concerned.

A principal object of the present invention is to provide an improved alumina pebble having high resistance to breakage under severe cyclic thermal and mechanical shock conditions. It is also an object of the invention to provide a method of producing high alumina content pebbles having high resistance to attrition and fracture when recycled continuously in cyclic heat transfer equipment. Another object of the invention is to provide a method of heat treating pebbles compacted from alumina and an oxide of vanadium or of a vanadium compound converted to vanadium oxide by calcination, so as to develop a better bond between the alumina crystals and stabilize their growth. A further object of the invention is to provide a method of stabilizing alpha corundum crystal growth in a pebble of high alumina content. It is also an object of the invention to provide improved heat-exchange processes utilizing alumina pebbles stabilized against alpha corundum crystal growth with vanadium oxide. Other objects of the invention will become apparent from a consideration of the accompanying disclosure.

The invention is concerned with bonding of alumina crystals and stabilizing the crystals against further growth by the incorporation of vanadium oxide or a compound convertible to vanadium oxide in a high purity alumina pebble. It is found that the oxides of vanadium, when incorporated in an alumina pebble which is thereafter heat treated as hereinafter set forth, effect a strong bonding action on the alpha corundum crystals of the final pebble and stabilize these crystals against further growth while in service in pebble heat-exchange apparatus at temperatures up to the firing temperatures of the pebble. A much more attrition and fracture resistant pebble is likewise found to be produced.

The process of the invention in its broadest form entails forming a homogeneous mixture of high purity alumina in powdered form and a finely divided vanadium compound, either an oxide or a compound convertible to the oxide upon calcination at temperatures in the range of 2900° to 3200° F., and compacting the mixture into balls with the aid of a binder, such as water and/or a volatilizable organic binder and lubricant, such as Sterotex (hydrogenated corn oil), any of the synthetic or natural resins (including wood rosin), petroleum pitch, stearic acid, aluminum stearate, carboxymethyl cellulose, molasses, sugar, dextrin, etc. A preferred method of forming alumina pebbles is to prepare a plastic, extrudable mixture of alumina and a suitable vanadium compound containing between 10 and 25 weight per cent water based on the weight of the mix, extrude and cut the extrudate into short slugs, and compact the slugs into spheres by tumbling or other suitable technique. It is desirable to incorporate in the pebble mix one or more of the aforesaid organic binders in a total amount of 1 to 5 per cent based on the weight of the solid constituents. The water and organic binder serve to hold the pebbles or balls in shape prior to the firing or calcining step at which time they are either vaporized or burned out.

The pebbles or balls may also be compacted from a homogeneous plastic mix of the constituents and organic binder without the use of added water in which case from 2 to 10 per cent of the binder is added. In this method of manufacture heat may be applied to the mix in order to facilitate the pebble forming step.

Another pebble forming method involves starting with a small alumina-vanadium compound core and applying successive layers of the powdered mixture of alumina and vanadium compound using a tacky binder of the class described, particularly dextrin, molasses, sugar, glue, shellac, etc.

The invention in its broadest sense does not require any specific pebble forming step although it is preferred to form the pebbles from an extrudable plastic mix of the pebble constituents by extruding and cutting the extrudate into short slugs and thereafter compacting the slugs into spheres by tumbling in a three-dimensional type cylindrical tumbler, because this method produces superior pebbles in attrition and fracture resistance in cyclic pebble heat-transfer equipment. Any method of compacting the pebble constituents into a homogeneous dense ball or sphere is suitable and within the scope of this invention.

The alumina for the pebbles of the invention may be incorporated in the mix in the form of alpha corundum, gamma alumina, any of the hydrated aluminas which are converted to alpha corundum by heating to elevated temperatures, or aluminum hydroxide. It is desirable that the alumina be of high purity, such as 99 per cent and preferably 99.5 per cent. Purified bauxite, precipitated aluminum hydroxide, and the alumina manufactured in the Bayer process are examples of suitable raw materials for the alumina. A preferred alumina is the finely divided precalcined crypto-crystalline alpha corundum formed by calcining Bayer process alumina at temperatures around 2100° F. The alumina raw material must be finely comminuted such as to pass a 100 mesh screen, and preferably in the range of 150 to 625 mesh, so as to form coherent balls in which the alumina and vanadium compound are intimately associated and which are of exceedingly fine grain.

The source of the vanadium oxide may be any of the oxides of vanadium or any of the vanadium compounds which are converted to the oxide when calcined at temperatures above about 2500° F. These comprise the acids and hydroxides of vanadium and ammonium vanadate. The vanadium compounds should be incorporated into the pebble mixture in finely divided form of at least 100 mesh fineness, and when using water soluble compounds, their solutions may be added so as to form an intimate dispersion of the metal compound in the alumina particles.

In compacting pebbles according to a preferred modification of the invention, a homogeneous aqueous plastic mix is formed by mixing finely comminuted alumina and a selected vanadium compound with a suitable organic binder. The mixture is thoroughly plasticized in a mulling pan mixer with sufficient water to produce a mix containing between 10 and 25 weight per cent water which has the proper consistency for extrusion. The water content may be adjusted either up or down at any time during the plasticizing and homogenizing step to within the range just recited so as to obtain the proper consistency for extrusion. The homogeneous mix or paste is then preferably extruded through dies, in either a piston or a screw type extrusion press, into macaroni type cylinders or rods which are automatically cut off into short lengths corresponding to the diameter or cross-section of the rods so as to form slugs adaptable for balling. Deairing is preferred with a screw type extruder. Drying the paste or mix to a moisture content within the range of 10 to 25 per cent is necessary in order to permit proper extrusion. The moisture content of the mix for the extrusion step is important because, when it amounts to less than 10 per cent, the slugs formed from the extruded rods are not completely homogeneous in structure and will result in the formation of an inferior pebble. If the moisture content exceeds 25 per cent, the extruded rods are too sticky and the slugs cannot be properly handled in the subsequent balling step. For best performance during extrusion, a moisture content between about 16 and 20 per cent by weight is desirable. When making $\frac{5}{16}''$ pebbles, extrusion of the plastic mix into $\frac{3}{8}''$ rods and cutting them into $\frac{3}{8}''$ lengths permits the compacting of slugs which will be of the desired size after firing. High pressure extrusion of this type, preferably in a piston type press, with or without deairing of the feed, is preferred to other methods of preparing the slugs for the balling operation, inasmuch as a homogeneous body results with minimum variations in structure after firing, together with avoidance of laminar structure. However, other methods of preparing the slugs are within the scope of the invention.

Following the cutting of the extruded mix into slugs, the slugs are preferably dried to a moisture content between about 10 and 15 per cent by weight before compacting or rolling into balls, the next step of the operation. Wetter slugs tend to ball up and stick together, while dry slugs roll up into balls which develop internal cracks upon firing. A preferred moisture content for this step lies between 11.5 and 13 per cent. Compacting of the alumina slugs into balls or pebbles can be performed in several ways. Rolling of the slugs in a balling machine utilizing three-dimensional rotation in a cylindrical drum placed at angles to all three axes of conventional rotary equipment is found to make the most suitable pebbles upon firing. The balls are more firmly compacted and more nearly spherical in shape than when made by any other known method. This is probably due to the fact that the slugs are rolled in all directions during the rolling or compacting step. The resulting spherical pebbles containing the proper amount of moisture do not stick together and may be stored temporarily or transferred directly to the next step which is the firing operation. The tumbling mill may be hot air or flue gas swept to eliminate the predrying step.

After the balling step it is necessary to thoroughly but slowly dry the balls to less than one weight per cent moisture before firing to high temperatures. This can be accomplished in a variety of commercial dryers. Slowness in drying is required to insure removal of moisture from the center core of the pebble and to prevent cracked internal structure from too fast heating and drying in the subsequent calcining kilns. The temperature in the dryer should not exceed about 400° F. until the moisture content of the balls is reduced to approximately 1 or 2 weight per cent.

The critical firing temperature of the compacted balls of alumina and vanadium compound is found to lie in the range of 2900° to 3200° F. with an optimum range of 3000° to 3100° F. When the pebbles are fired at lower temperatures, the bond is apparently not sufficiently developed and when firing above this range, the pebbles are apparently too hard and rigid under conditions of cyclic thermal and mechanical shock and have poorer attrition resistance in pebble heater operation. Firing in the above range must be continued for at least 3 hours and until the porosity of the pebbles lies in the range of 5 to 18 per cent, and preferably 7 to 13 per cent (both available and unavailable porosity). When hydrated alumina, gamma alumina, or aluminum hydroxide is included in the initial pebble composition, it is gradually converted to alpha alumina (corundum) as the heat treatment of the pebble progresses at elevated temperatures upwards of about 1800° F. During the firing to high temperature, several changes occur depending upon the materials included in the pebble. Hydrates of alumina and hydroxides will decompose to form the corresponding oxides, and non-crystalline alumina, if present, will progressively be converted to gamma and to finely crystalline alpha corundum. During the calcination of pure alumina at these temperatures the original alpha corundum crystals and/or those formed during the calcination grow to an average size of at least 25 to 30 microns, but when heated in admixture with vanadium oxide in an amount within the range of 0.2 to 5 per cent by weight of alumina, the vanadium oxide has the effect of stabilizing the growth of alpha corundum crystals. By incorporating this amount of vanadium oxide in alumina pebbles according to the invention and calcining the pebbles at the required temperatures, the average alpha corundum crystal size is kept to a maximum of 10 microns and when an alumina pebble contains a fine dispersion of vanadium oxide in an amount in the range of 0.5 to 2.0 weight per cent based on the alumina and calculated as $V_2O_5$, the average crystal size is kept to a maximum of 5 or 6 microns.

The exact chemical composition and physical structure of the finished alumina pebbles of the invention, after heat treatment at the temperature specified, are not known but it is believed that the vanadium oxide or a portion of it, at least, enters the crystal lattice of the alpha corundum before any appreciable crystal growth takes place and thereby prevents the growth of alpha corundum crystals by cannibalization. However, I do not wish to be bound by any theory as to how the vanadium oxide functions and as to the exact structure of the final pebble composition other than the fact that the pebbles consist of at least 94 to 95 per cent alumina and can be made only by incorporating the specified amount of vanadium compound in an otherwise substantially pure alumina pebble and subjecting the pebble to an extended heat treatment of at least 3 hours in the range of 2900° to 3200° F. and until the porosity of the pebbles lies in the range of 5 to 18 per cent.

Firing or calcination of the pebbles can be suitably effected in any conventional equipment which results in maintaining the entire mass of pebbles at a relatively even temperature within the specified range. Firing in continuous shaft kilns produces pebbles which are inferior in service in pebble heater type apparatus because they are not uniformly heated in all parts of the bed, a large proportion being either underfired or overfired. The former are not strong and stand up poorly to heat and mechanical shock and attrition, while the latter are too rigid and soon develop cracks along large crystal faces, resulting in early breakage in service as well as low resistance to attrition.

The following example illustrates the invention but is not to be construed as unduly and unnecessarily limiting the invention.

*Example*

Ninety-nine weight per cent of 325 mesh and finer Bayer process alumina of 99.5 per cent purity and 1 weight per cent of powdered $V_2O_5$ are mixed with 4 weight per cent of equal parts of Sterotex and carboxymethyl cellulose and sufficient water (16 weight per cent) to form a homogeneous plastic extrudable mix. The mix is then extruded in a piston-type extrusion press into 3/8" rods and automatically sliced into slugs approximately 3/8" in length. These slugs are then tumbled into spheres in a three-dimensional tumbling drum swept by a low temperature flue gas to reduce moisture content to about 11 per cent. Residence time in the tumbling drum is maintained at a minimum of 28 minutes before the partially dried spheres are discharged. They are then slowly dried in conventional flue gas dryers to remove free water. Final firing is performed in a periodic kiln allowing a 12 hour heat soak at 3100° F. with commercial firing rates to and from this top temperature.

The resulting pebbles are approximately 5/16" in diameter and are smooth, hard, dense, and tough. Total porosity ranges from 8 to 12 per cent and they have a crushing strength of more than 1500 pounds. The average crystal size of the alpha corundum is less than 3 microns with a maximum crystal size of approximately 6 microns. These pebbles stand up exceptionally well in heat shock and attrition tests compared to a non-stabilized commercial alumina pebble. Their relative resistance to heat shock in cylic accelerated heat shock tests is five times greater while attrition resistance to each other is more than three times that of the commercial alumina pebbles.

Certain modifications of the invention will become apparent to those skilled in the art and the illustrative details disclosed are not to be construed as imposing unnecessary limitations on the invention.

I claim:

1. A process for manufacturing pebbles for moving-bed heat-transfer purposes which comprises forming a homogeneous mixture of alumina and a vanadium compound of the class consisting of the oxides and compounds converted to an oxide by calcination in an amount in the range of 0.2 to 5.0 per cent (calculated as $V_2O_5$) by weight of the alumina; compacting the mix into dense coherent balls; and calcining the balls at a temperature in the range of 2900° to 3200° F. for at least 3 hours and until their porosity lies in the range of 5 to 18 per cent.

2. The process of claim 1 in which said vanadium compound is an oxide.

3. The process of claim 1 in which said vanadium compound is $V_2O_5$.

4. The process of claim 1 in which said vanadium compound is ammonium vanadate.

5. The process of claim 1 in which said vanadium compound is vanadic acid.

6. A process for manufacturing pebbles for moving-bed heat-transfer purposes which comprises compacting 1/8" to 1" balls from an intimate plastic, aqueous, compactable mix of alumina of at least 100 mesh fineness and a vanadium compound of the class consisting of the oxides and compounds converted to an oxide by the following calcination step in an amount in the range of 0.2 to 5.0 per cent (calculated as $V_2O_5$) by weight of the alumina; slowly drying said balls to a water content below 1 per cent by weight so as to avoid forming cracks therein; and calcining the dried balls at a temperature in the range of 2900° to 3200° F. for at least 3 hours and until their porosity lies in the range of 5 to 18 per cent.

7. The process of claim 6 in which the amount of said vanadium compound is in the range of 0.5 to 2.0 per cent.

8. A process for manufacturing pebbles for moving-bed heat-transfer purposes which comprises forming an intimate plastic, aqueous, compactable mix of finely comminuted alumina of at least 100 mesh fineness and at least 99 per cent purity and a finely divided vanadium compound of the class consisting of the oxides and compounds converted to an oxide by the following calcination step in an amount in the range of 0.2 to 5.0 per cent (calculated as $V_2O_5$) by weight of the alumina; adjusting the water content of said mix to the range of 10 to 20 per cent by weight; compacting the mix into 1/8" to 1" dense coherent balls; slowly drying the balls to a water content below 1 per cent by weight so as to avoid forming cracks therein; and calcining the dried balls at a temperature in the range of 2900° to 3200° F. for at least 3 hours and until their porosity lies in the range of 8 to 15 per cent.

9. The process of claim 8 in which the compacting step comprises extruding the mix into rods ⅛" to 1" in cross section, cutting the rods into slugs of a length corresponding to their cross section, and compacting the slugs into balls.

10. A process for manufacturing pebbles for moving-bed heat-transfer purposes which comprises forming an intimate plastic, aqueous, compactable mix of 150–165 mesh alumina of at least 99 per cent purity and a vanadium compound of the class consisting of the oxides and compounds converted to an oxide by calcination at temperatures below about 2500° F. in an amount in the range of 0.5 to 2.0 per cent (calculated as $V_2O_5$) by weight of the alumina; adjusting the water content of said mix to the range of 16 to 20 per cent by weight; extruding the mix into ⅛" by 1" rods and cutting the rods into slugs of a length approximating their diameter; drying the slugs to a water content in the range of 10 to 15 per cent by weight; compacting the slugs into balls by three-dimensional tumbling; slowly drying the balls to a water content below 1 per cent by weight in an atmosphere below 400° F. so as to avoid the formation of cracks in said balls; and calcining the dried balls at a temperature in the range of 2900° to 3200° F. for at least 3 hours and until their porosity lies in the range of 8 to 15 per cent.

11. The method of improving the abrasion and fatigue resistance of high alumina pebbles in pebble heater type operation, which comprises forming a homogeneous mixture of relatively pure alumina and a vanadium compound of the class consisting of the oxides and compounds converted to the oxide by calcination at temperatures below 2500° F. in an amount in the range of 0.2 to 5 per cent (calculated as $V_2O_5$) by weight of the alumina; compacting the mixture into dense, coherent, plastic ⅛" to 1" balls; calcining the balls at a temperature in the range of 2900° to 3200° F. for at least 3 hours and until their porosity lies in the range of 5 to 18 per cent.

12. The method of claim 11 in which the amount of vanadium compound is in the range of 0.5 to 2.0 per cent.

13. Hard, dense, smooth, wear resistant alumina-vanadium oxide pebbles manufactured by the process of claim 1 and having an average alpha corundum crystal size of less than 5 microns.

14. Hard, dense, smooth, wear resistant alumina-vanadium oxide pebbles manufactured by the process of claim 6 and having an average alpha corundum crystal size of less than 5 microns.

15. Hard, dense, smooth, wear resistant alumina-vanadium oxide pebbles manufactured by the process of claim 7 and having an average alpha corundum crystal size of less than 5 microns.

SAM P. ROBINSON.

REFERENCES CITED

The following references are of record in the file of this patent:

UNITED STATES PATENTS

| Number | Name | Date |
|---|---|---|
| 2,311,228 | Heany | Feb. 16, 1943 |
| 2,369,709 | Baumann | Feb. 20, 1945 |
| 2,399,225 | Heany | Apr. 30, 1946 |
| 2,418,495 | Baumann | Apr. 8, 1947 |
| 2,432,520 | Ferro, Jr. | Dec. 16, 1947 |
| 2,432,873 | Ferro, Jr., et al. | Dec. 16, 1947 |
| 2,482,580 | Feichter | Sept. 20, 1949 |
| 2,489,628 | Evans | Nov. 29, 1949 |
| 2,494,695 | Fischer | Jan. 17, 1950 |
| 2,499,704 | Utterback | Mar. 7, 1950 |
| 2,532,606 | Church | Dec. 5, 1950 |
| 2,532,613 | Dutcher | Dec. 5, 1950 |